No. 700,165. Patented May 20, 1902.
C. M. BLYDENBURGH.
CRANBERRY PICKER.
(Application filed Oct. 17, 1901.)
(No Model.)

Witnesses
Fenton S. Pelt,
C. W. Fowler

Inventor
Charles M. Blydenburgh
By P. Walter Fowler
Attorney

UNITED STATES PATENT OFFICE.

CHARLES M. BLYDENBURGH, OF RIVERHEAD, NEW YORK.

CRANBERRY-PICKER.

SPECIFICATION forming part of Letters Patent No. 700,165, dated May 20, 1902.

Application filed October 17, 1901. Serial No. 78,942. (No model.)

*To all whom it may concern:*

Be it known that I, CHARLES M. BLYDENBURGH, a citizen of the United States, residing at Riverhead, in the county of Suffolk and State of New York, have invented new and useful Improvements in Cranberry-Pickers, of which the following is a specification.

This invention relates to the class of harvesting-machines, and is especially designed for harvesting crops of berries and particularly cranberries; and the invention consists, essentially, in a berry picker or harvester having a chamber or pan for collecting the berries and certain extensions of the pan or chamber in the form of chambered fingers closed at the point, sides, and bottom and open at the top and into which fingers the berries drop when the device is pushed under the runners and the berries picked, brushed, or combed off in the usual well-known manner, after which the device may be drawn from beneath the runners without loss of any of the berries which are contained in the fingers.

The invention also consists of the improved cranberry-picker, which I shall hereinafter describe, and specifically point out in the claims.

Figure 1:
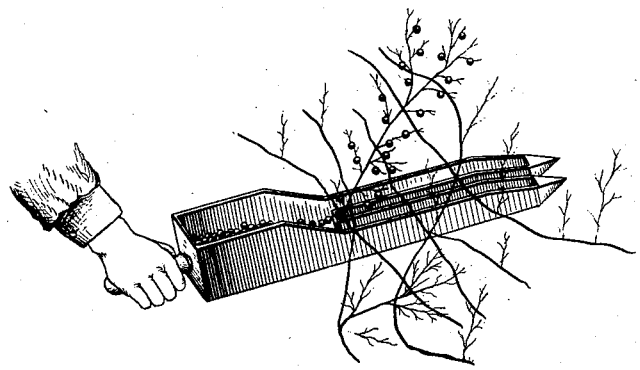
Figure 2:
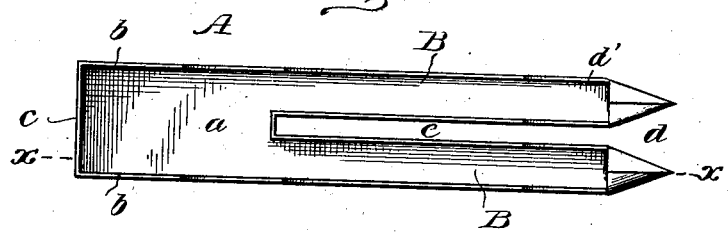
Figure 3:
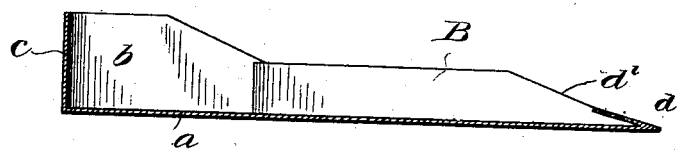
Figure 4:
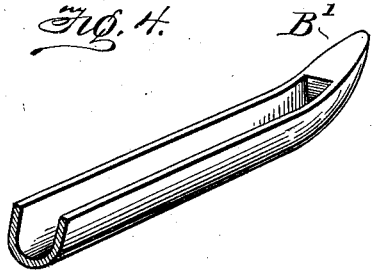
Figure 5:
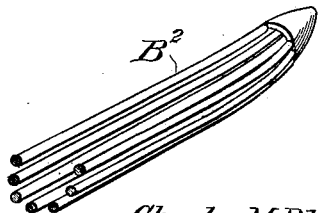

In the accompanying drawings, forming part of this specification, and in which similar letters of reference indicate like parts, Figure 1 represents a perspective view of a berry-harvester embodying my invention. Fig. 2 is a top plan view. Fig. 3 is a horizontal sectional view on the line $x$ $x$ of Fig. 2. Figs. 4 and 5 are modifications to be referred to.

It is well understood by those familiar with the planting of the cranberry crop that the vines on which the cranberries grow are short shoots about two (2) to six (6) inches long, which extend from long wire-like runners, which cover the ground and constitute a sort of mass or mat of fine roots intimately interlaced.

The berries mature upon the shoots, and when the crop is ready for harvesting, and which harvesting is most extensively done by hand, care must be exercised to prevent the berries falling into the mass of runners and becoming practically inaccessible. When the picking is done by hand, the berries must be carefully handled. Otherwise great numbers are shaken from the plants and falling into the mass of runners beneath become a practical loss.

When using a device similar to the one shown in the drawings, the harvesting of the crop is much lightened, while the waste in berries is practically eliminated. The device comprises a receptacle A of a general pan-like formation and may be constructed of any suitable or desired material. As herein shown, the receptacle or pan is of a substantially rectangular shape, having a flat bottom $a$, vertical sides $b$, and a back $c$. The pan is preferably deeper at the rear than at the front. At the front the bottom is extended to form the bottoms of a plurality of hollow fingers B, said fingers being closed at the bottom and sides and having the front portions of the sides converging to form pointed ends, which are closed to form a shoe $d$, adapted to readily penetrate the mass of runners and allow the open upper sides of the fingers to catch any berries which fall from the shoots above. The front portions of the upper edges of the sides of the fingers may also incline downwardly, as shown at $d'$.

The fingers are independent of each other and are separated by a space $e$, not of sufficient size to allow the berries to drop through, but which space will permit the fingers to be pushed deep into the mass of runners.

I am aware that devices have been made for harvesting cranberries, which devices employ solid wires or other comb-like formation at the front; but the objection to this form of device is that when the device is withdrawn from beneath the mass of runners the latter sweep many of the berries from the teeth, thereby entailing a considerable loss. With the use of my device, with its hollow fingers, this loss is obviated, as each finger forms substantially a closed receiver, into which the berries fall and from which they cannot escape when the device is being withdrawn from beneath the runners.

In operation the device is pushed in under the runners, the pointed ends of the fingers readily pushing said runners aside to allow for the proper positioning of the device. Then the berries are picked, brushed, or combed off and allowed to fall, when they are received into the fingers and are drawn out with the fingers without loss, and the fingers all communicating at their rear open ends with the chamber of the pan may discharge their contents into the latter, from whence the berries may be delivered to any receptacle intended to receive them.

The device is simple, cheaply constructed, and effective in operation and greatly facilitates the gathering of crops like cranberries.

When the berries grow on short shoots or upright vines, the device instead of being pulled out from under the vines, as in the first instance, may simply be lifted up and the vines drawn through the spaces between the fingers, thereby stripping off the berries.

Under certain conditions, as when the vines grow along the edges of drains or ditches, the forward end of the fingers may be turned upwardly, as shown at B' in Fig. 4, making their operation more effective.

The fingers may also be made of parallel wires or open-work, as shown at B² in Fig. 5, so that leaves and dirt may sift through them, said wires converging and being united at points to form the fingers.

Having thus described my invention, what I claim as new, and desire to secure by Letters Patent, is—

1. A berry harvester or picker consisting of a single structure including a pan and forwardly-extending fingers said fingers being closed at the bottom and sides and open at the top, and communicating at their rear ends with said pan.

2. A berry harvester or picker consisting of a single structure including a pan having forwardly-extending separated fingers at the front said fingers having a bottom, sides, and a pointed front end, and being open at the top and having their rear ends open to communicate with the pan.

3. A berry-harvester consisting of a pan or receiver, and fingers at the front portion thereof and closed at the sides and bottom and open at the top, said fingers having the forward extremities of their sides converging to form a pointed end, and the upper edges of the forward portions of the sides inclining downwardly toward said end, and the rear portions of the fingers communicating with the pan.

In testimony whereof I have hereunto set my hand in presence of two subscribing witnesses.

CHARLES M. BLYDENBURGH.

Witnesses:
HENRY P. TUN,
B. FRANK HOWELL.